United States Patent
Nitta et al.

(10) Patent No.: US 10,518,621 B2
(45) Date of Patent: Dec. 31, 2019

(54) VEHICLE REAR STRUCTURE

(71) Applicant: HONDA MOTOR CO., LTD., Tokyo (JP)

(72) Inventors: Takashi Nitta, Wako (JP); Takashi Yamada, Wako (JP); Hiroyuki Ozawa, Wako (JP); Kanji Kaneko, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/108,650

(22) Filed: Aug. 22, 2018

(65) Prior Publication Data
US 2019/0061507 A1    Feb. 28, 2019

(30) Foreign Application Priority Data
Aug. 25, 2017 (JP) .................... 2017-162383

(51) Int. Cl.
*B60K 1/04* (2019.01)
*H01M 2/10* (2006.01)
*B60L 50/60* (2019.01)

(52) U.S. Cl.
CPC ............. *B60K 1/04* (2013.01); *B60L 50/66* (2019.02); *H01M 2/1083* (2013.01); *H01M 2220/20* (2013.01)

(58) Field of Classification Search
CPC .................... B60K 2001/0438; B60Y 2306/01
See application file for complete search history.

(56) References Cited

U.S. PATENT DOCUMENTS

| | | | |
|---|---|---|---|
| 2009/0166116 A1* | 7/2009 | Kiya | B60K 1/04 180/68.5 |
| 2013/0126255 A1* | 5/2013 | Saeki | B60K 1/04 180/68.5 |
| 2015/0273973 A1* | 10/2015 | Tomizawa | B60G 21/0551 280/124.109 |
| 2017/0001586 A1* | 1/2017 | Ashraf | B60R 19/34 |
| 2017/0088178 A1* | 3/2017 | Tsukada | B60K 1/04 |
| 2018/0029457 A1* | 2/2018 | Shimoda | B60K 1/04 |
| 2018/0126835 A1* | 5/2018 | Saeki | B60G 13/001 |
| 2018/0312197 A1* | 11/2018 | Takahashi | B62D 21/02 |

FOREIGN PATENT DOCUMENTS

| | | |
|---|---|---|
| JP | 2015-189339 A | 11/2015 |
| JP | 2016-052862 A | 4/2016 |
| JP | 2017-013593 A | 1/2017 |

OTHER PUBLICATIONS

Japanese Office Action with English translation dated Mar. 19, 2019, 6 pages.

* cited by examiner

*Primary Examiner* — Brian L Swenson
(74) *Attorney, Agent, or Firm* — Rankin, Hill & Clark LLP

(57) ABSTRACT

A vehicle rear structure includes: a battery case to house a battery; a rear side frame, a rear crossmember, and a gusset, which are included in a rear load transfer member which is disposed rearward of the battery case and transfers forward a collision load at the time of collision; and a bracket to transfer the collision load from the rear load transfer member to the battery case. The bracket extends from the rear load transfer member to below the battery case and is joined to a bottom surface of the battery case in an up-down direction.

10 Claims, 8 Drawing Sheets

VEHICLE REAR STRUCTURE

BACKGROUND OF THE INVENTION

1. Field of the Invention

The present invention relates to a vehicle rear structure for automobiles.

2. Description of the Related Art

In a known conventional vehicle rear structure, rear side frames are connected to the rear ends of side sills; coupled to the lower portions of the rear side frames is a rear subframe on which the driving unit and other parts are mounted; and from the rear side frames, inclined members extend obliquely forward and inward in the vehicle width direction (for example, see Patent Literature 1). In this vehicle rear structure, the front ends of the inclined members are connected to a crossmember that bridges the rear side frames. In this vehicle rear structure, front walls of the brackets extending downward from the connecting portions between the inclined members and the crossmember are in contact with a rear wall of a battery frame.

In this vehicle rear structure, when a load at a rear-end collision of the vehicle (collision load) is inputted to the rear side frames, the collision load is transferred from the rear side frames to the side sills. The collision load is also transferred from the rear side frames to the battery frame via the inclined members and the brackets. Thus, the rear side frames transfer the collision load to the side sills and the battery frame efficiently. The vehicle rear structure absorbs collision energy efficiently.

PRIOR ART DOCUMENT(S)

Patent Literature(s)

Patent Literature 1: JP 2016-052862 A

SUMMARY OF THE INVENTION

In a conventional vehicle rear structure (for example, see Patent Literature 1), the battery frame, unfortunately, is disposed below the inclined members. For this reason, the collision load inputted from the inclined members to the upper portions of the brackets is transferred to the battery frame via the lower portions of the brackets. As a result, at the lower portions of the brackets, forces are generated in peeling directions from the rear wall of the battery frame. Hence, the conventional vehicle rear structure has a problem in that the collision load inputted to the rear side frames is not transferred forward of the vehicle body efficiently, and that the joint strength of the brackets are insufficient.

An object of the present invention is to provide a vehicle rear structure that is capable of transferring the collision load inputted to the rear side frames forward of the vehicle body efficiently, and in which the joint strength of the brackets is excellent.

To solve the above problems, a vehicle rear structure includes: a battery case to house a battery; a rear load transfer member which is disposed rearward of the battery case and transfers forward a collision load at the time of collision; and a bracket to transfer the collision load from the rear load transfer member to the battery case, and the bracket extends from the rear load transfer member to below the battery case and is joined to a bottom surface of the battery case in an up-down direction.

The vehicle rear structure according to the present invention provides a vehicle rear structure that is capable of transferring the collision load inputted to the rear side frames forward of the vehicle body efficiently, and in which the joint strength of the brackets is excellent.

DETAILED DESCRIPTION OF THE EMBODIMENTS

Description will be provided in detail for a vehicle rear structure according to an embodiment of the present invention (this embodiment) with reference to the drawings as appropriate.

Hereinafter, the present invention will be described specifically, taking, as an example, a vehicle rear structure used in an electric vehicle, a plug-in hybrid vehicle, or the like which are equipped with a battery for the driving unit.

In the vehicle rear structure of this embodiment, brackets extending from a rear load transfer member toward below a battery case located at the front are joined to the bottom surface of the battery case in the up-down direction.

Figure 1:
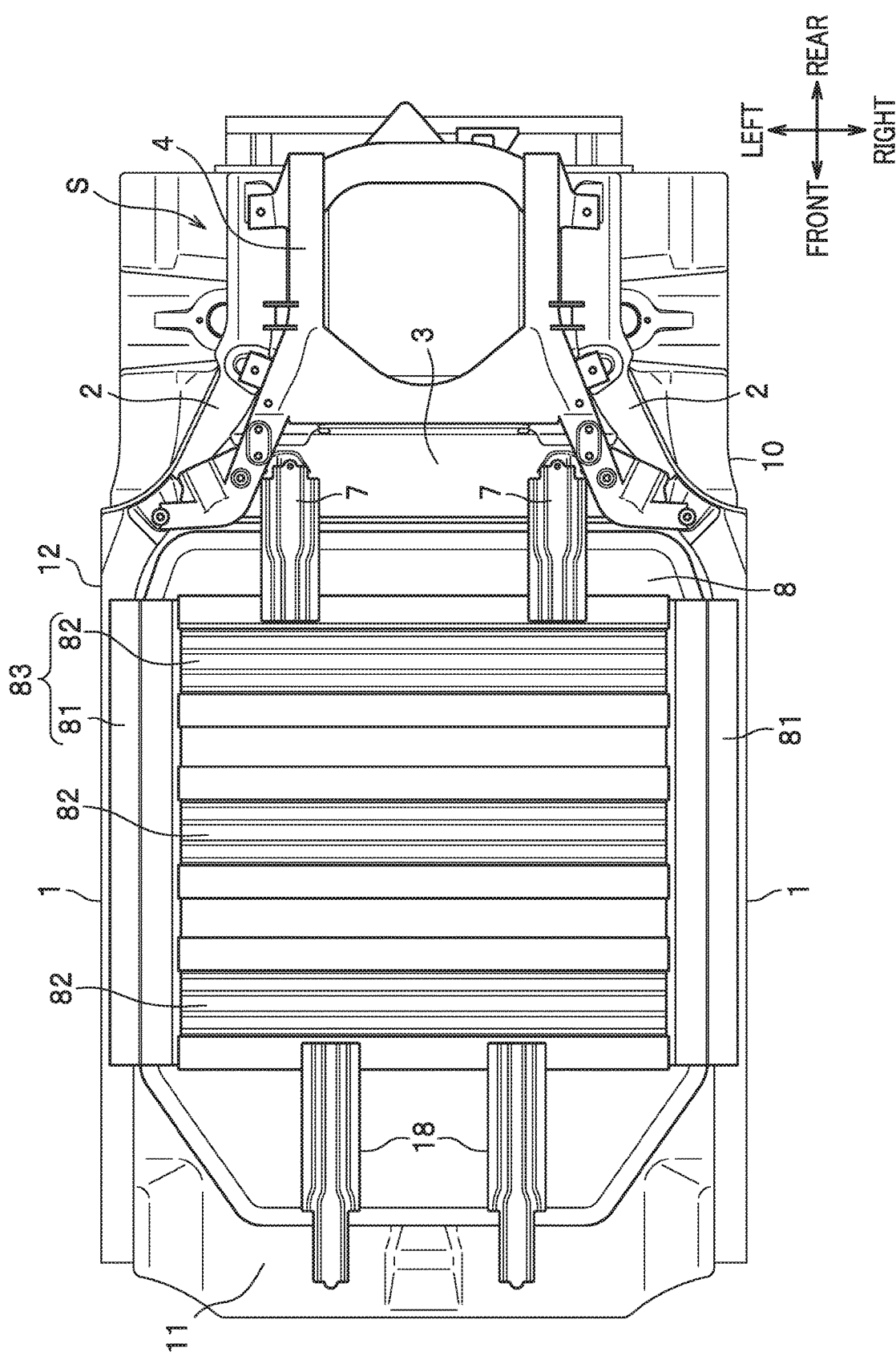
FIG. 1 is a bottom view of a vehicle having a vehicle rear structure according to the embodiment of the present invention.
Figure 2:
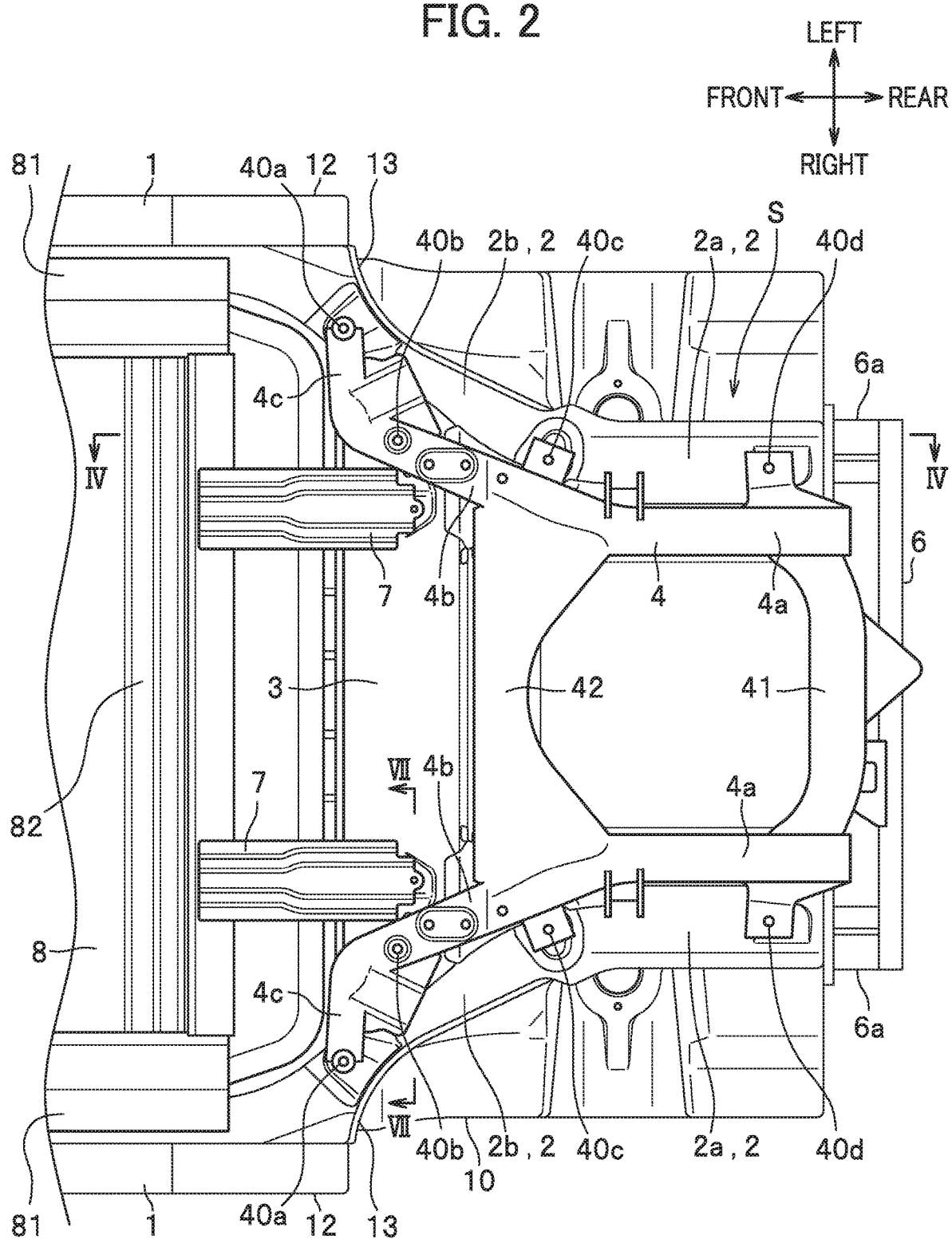
FIG. 2 is a partially enlarged view of the rear portion of the vehicle in FIG. 1.
Figure 3:
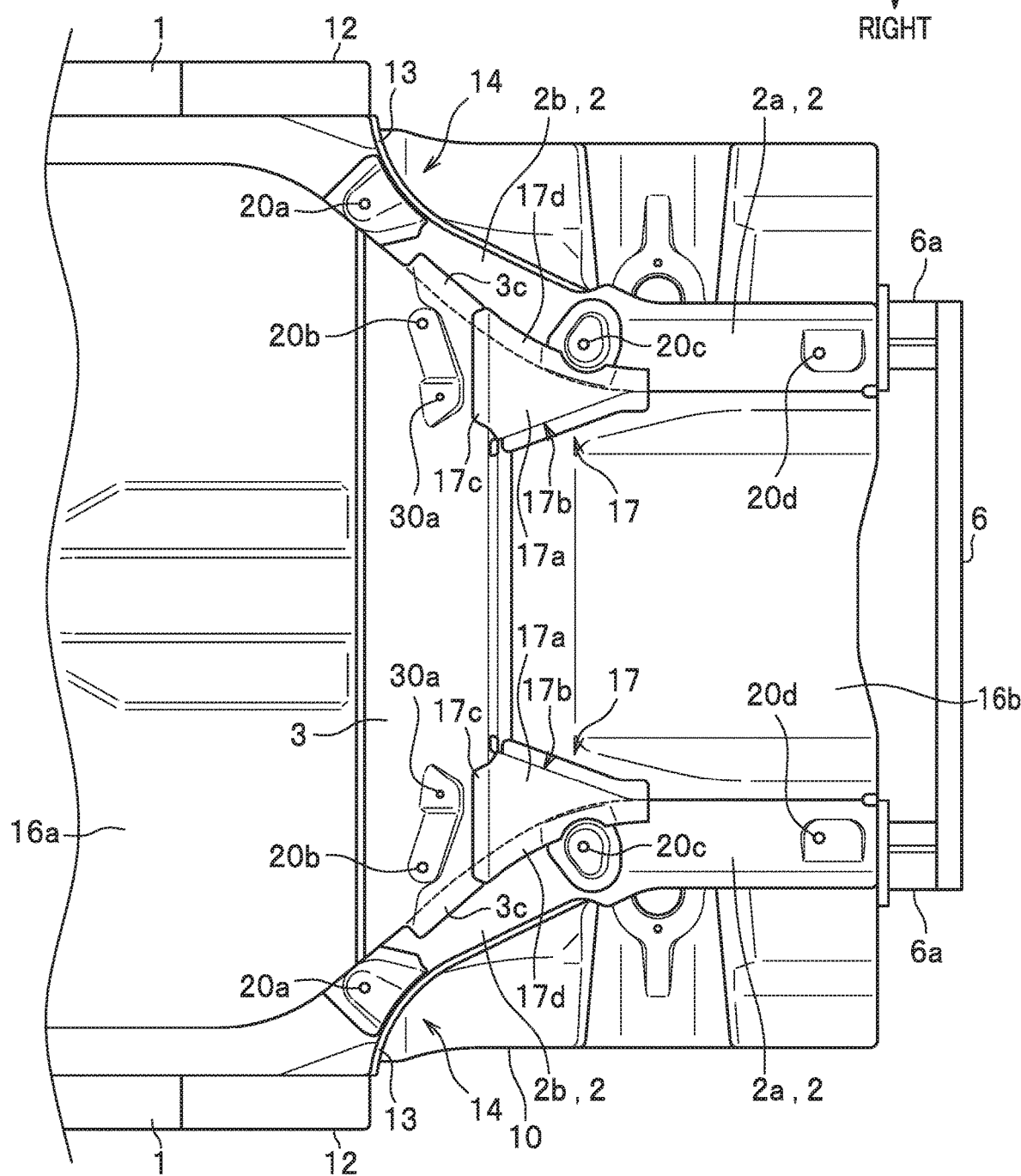
FIG. 3 is a bottom view of the rear portion of the vehicle in which a rear subframe, a battery case, and brackets are omitted from FIG. 2.
Figure 4:
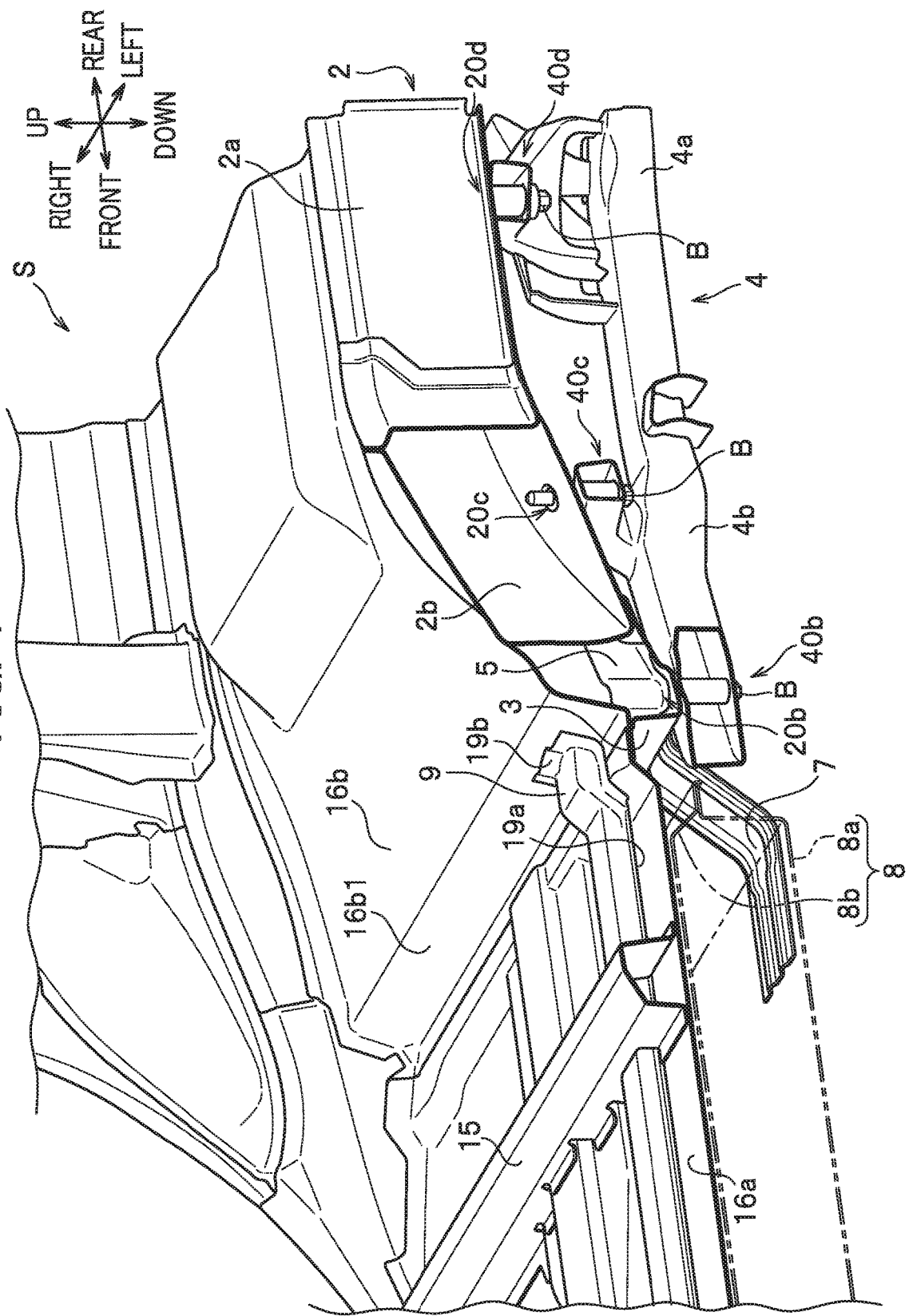
FIG. 4 is a partial perspective view of the vehicle rear structure including a cross section taken along the line IV-IV in FIG. 2.

FIG. 1 is a bottom view of a vehicle 12 having a vehicle rear structure S according to this embodiment. FIG. 2 is a partially enlarged view of the rear portion of the vehicle in FIG. 1. FIG. 3 is a bottom view of the rear portion of the vehicle 12 in which a rear subframe 4, a battery case 8, and brackets 7 are omitted from FIG. 2. FIG. 4 is a partial perspective view of the vehicle rear structure S including a cross section taken along the line IV-IV in FIG. 2. Note that in FIG. 4, the battery case 8 is indicated by imaginary lines (dashed double-dotted lines).

In the following description, up, down, front, rear, right, and left directions agree with the up, down, front, rear, right, and left directions viewed from a driver seated in the vehicle 12. Note that the right-left direction agrees with the vehicle width direction.

As shown in FIG. 1, the vehicle rear structure S in this embodiment includes side sills 1 extending in the front-rear direction on both sides of a vehicle body 10, rear side frames 2 extending rearward from the rear ends of the side sills 1, a rear crossmember 3 coupling the rear side frames 2 to each other, and a rear subframe 4 disposed below the rear side frames 2. In addition, as shown in FIG. 3, the vehicle rear structure S in this embodiment further includes gussets 17 coupling the rear side frames 2 and the rear crossmember 3. In addition, the vehicle rear structure S in this embodiment further includes brackets 7 coupling the rear crossmember 3 and the battery case 8, and reinforcement members 9 complementing the brackets 7 (see FIG. 4).

Note that the rear side frames 2, rear crossmember 3, and gussets 17 in the vehicle rear structure S in this embodiment constitute a "rear load transfer member" referred to in claims.

<Side Sill>

Each side sill 1 shown in FIG. 1 is formed by connecting a side sill inner (not shown) and a side sill outer (not shown) disposed respectively on the inner side and the outer side in the vehicle width direction so as to form a hollow space inside, and inside of which a side sill stiffener (not shown) is disposed.

Although not shown, the side sills 1 extend to the vicinity of a dashboard lower at the front of the vehicle body.

<Rear Side Frame>

Next, description will be provided for the rear side frames 2 (rear load transfer member) with reference to FIGS. 2 and 3.

Each rear side frame 2 includes mainly a front-rear portion 2a and an oblique portion 2b.

The front-rear portion 2a is disposed rearward of the oblique portion 2b, which will be described next, and inward of the side sill 1 in the vehicle width direction and extends in the front-rear direction. Specifically, the front-rear portion 2a extends substantially in parallel with the axle and substantially horizontally. Note that the front-rear portion 2a in this embodiment extends in the front-rear direction and has a substantially constant width in bottom view.

Although not shown, the front-rear portion 2a has a closed cross-sectional structure in a substantially rectangular shape. To the rear ends of the front-rear portions 2a are connected the front surfaces of both ends of a bumper beam 6 extending in the vehicle width direction, via bumper beam extensions 6a.

The oblique portion 2b is connected to the front end of the front-rear portion 2a and extends obliquely so as to be displaced gradually outward in the vehicle width direction as extending frontward from the front end of the front-rear portion 2a.

Although not shown, the oblique portion 2b in this embodiment has a hat shape in cross-sectional view that opens outward in the vehicle width direction. Upper and lower flanges (not shown) of the oblique portion 2b, corresponding to the brim of the hat shape, are connected to the inner surface of a wheel arch 13 in the vehicle width direction by welding or other methods.

The oblique portion 2b connected to the wheel arch 13 forms a closed cross section in a substantially rectangular shape in cooperation with the wheel arch 13.

The front end of the oblique portion 2b is disposed inward of the side sill 1 in the vehicle width direction to be overlapped with the rear end of the side sill 1 in the front-rear direction, to which the front end of the oblique portion 2b is connected.

Although illustration of the vehicle body 10 in side view is omitted, the oblique portion 2b extends obliquely and gradually upward (toward the back side of the paper surface of FIGS. 2 and 3) as extending rearward from the connecting portion with the side sill 1, and the rear end of the oblique portion 2b is connected to the front end of the front-rear portion 2a.

At the distal end of the oblique portion 2b in this embodiment is formed a narrow portion 14 (see FIG. 3).

This narrow portion 14 is formed by the oblique portion 2b gradually decreasing in the lateral width (width in the direction orthogonal to the extending direction) as extending from the front-rear portion 2a side toward the side sill 1, and then halfway through it, gradually increasing in the lateral width conversely as extending to the connecting portion with the side sill 1.

The narrow portion 14 is formed by the outer edge of the oblique portion 2b in the vehicle width direction being recessed in an arc shape obliquely forward and inward in the vehicle width direction at a position adjacent to the connecting portion with the side sill 1.

On the rear side frame 2 described above are formed a first mounting portion 20a, third mounting portion 20c, and fourth mounting portion 20d for the rear subframe 4 (see FIG. 2) described later, as shown in FIG. 3. These mounting portions 20a, 20c, and 20d will be described later in detail.

<Rear Crossmember>

As shown in FIG. 3, the rear crossmember 3 (rear load transfer member) extends in the vehicle width direction below a rear floor panel 16b and is attached to the rear side frames 2 (rear load transfer member) so as to bridge the rear side frames 2.

Although not shown, the rear crossmember 3 has a hat shape in cross-sectional view that opens upward. Specifically, the rear crossmember 3 has a bottom wall, a front wall rising upward from the front edge of the bottom wall, a rear wall rising upward from the rear edge of the bottom wall, and a front flange and a rear flange forming the brim of the hat shape.

The front flange and the rear flange are connected to the lower surface of the rear floor panel 16b by welding or other methods.

The rear crossmember 3 connected to the rear floor panel 16b in this way forms a closed cross section in a substantially rectangular shape in cooperation with the rear floor panel 16b.

The both ends of the rear crossmember 3 in the vehicle width direction are connected to the oblique portions 2b of the rear side frames 2 by welding or other methods. Specifically, connection flanges 3c formed at both ends of the rear crossmember 3 are connected to the lower surfaces of the rear side frames 2 by welding or other methods.

The rear crossmember 3 in this embodiment couples the narrow portions 14 of the rear side frames 2 to each other.

On the rear crossmember 3 (rear load transfer member) as above are formed second mounting portions 20b for the rear subframe 4 (see FIG. 2) described later and bracket mounting portions 30a for the brackets 7 (see FIG. 1) supporting the battery case 8 from the rear crossmember 3.

These second mounting portion 20b and bracket mounting portion 30a are disposed to be adjacent to each other.

<Gusset>

As shown in FIG. 3, the gussets 17 (rear load transfer member) are members each of which has a substantially triangular shape in bottom view and is disposed at the corner formed by the rear side frame 2 (rear load transfer member) and the rear crossmember 3 (rear load transfer member).

Each gusset 17 includes a triangular plate member 17a disposed substantially on the same plane as the lower surfaces of the rear side frame 2 and the rear crossmember 3 and a leg plate member 17b bent toward the rear floor panel 16b at the opposite side from the angle formed by the oblique portion 2b and the rear crossmember 3. In other words, the gusset 17 is a bent plate having an L-shaped cross section formed by the triangular plate member 17a and the leg plate member 17b.

In addition, in the triangular plate member 17a of the gusset 17 is formed an edge 17c extending in the vehicle width direction in a range including the second mounting portion 20b for the rear subframe 4 and the bracket mounting portion 30a.

Also in the triangular plate member 17a of the gusset 17 is formed an edge 17d extending from the oblique portion 2b to the front portion of the front-rear portion 2a of the rear side frame 2.

The edge 17c of the gusset 17 is connected to the lower surface of the rear crossmember 3 by welding or other methods. The edge 17d of the gusset 17 is connected to the lower surface of the rear side frame 2 by welding or other methods.

<Battery Case and Battery-case Mounting Frame>

Next, description will be provided for the battery case 8 (see FIG. 1) and a battery-case mounting frame 83 (see FIG. 1).

As shown in FIG. 1, the battery case 8 is disposed frontward of the rear crossmember 3. This battery case 8 has a substantially rectangular shape in bottom view of the vehicle body 10. The battery case 8 is disposed between the side sills 1. The front end of the battery case 8 is adjacent to the rear edge of a dashboard lower 11.

The battery case 8 is supported by the battery-case mounting frame 83 described later.

Note that what reference sign 18 indicates in FIG. 1 is a pair of supporting members supporting the front portion of the battery case 8 from the dashboard lower 11.

As shown in FIG. 4, this battery case 8 mainly includes a tray 8a that houses a battery pack (not shown) formed of a lithium ion battery or the like and a lid 8b closing the upper opening of the tray 8a.

The bottom surface of the battery case 8 in this embodiment is located lower than the bottom wall of the rear crossmember 3 because of the thickness of the battery case 8 in the up-down direction. In other words, there is a step formed between the lower surface of the rear crossmember 3 and the bottom surface of the battery case 8.

Figure 5:
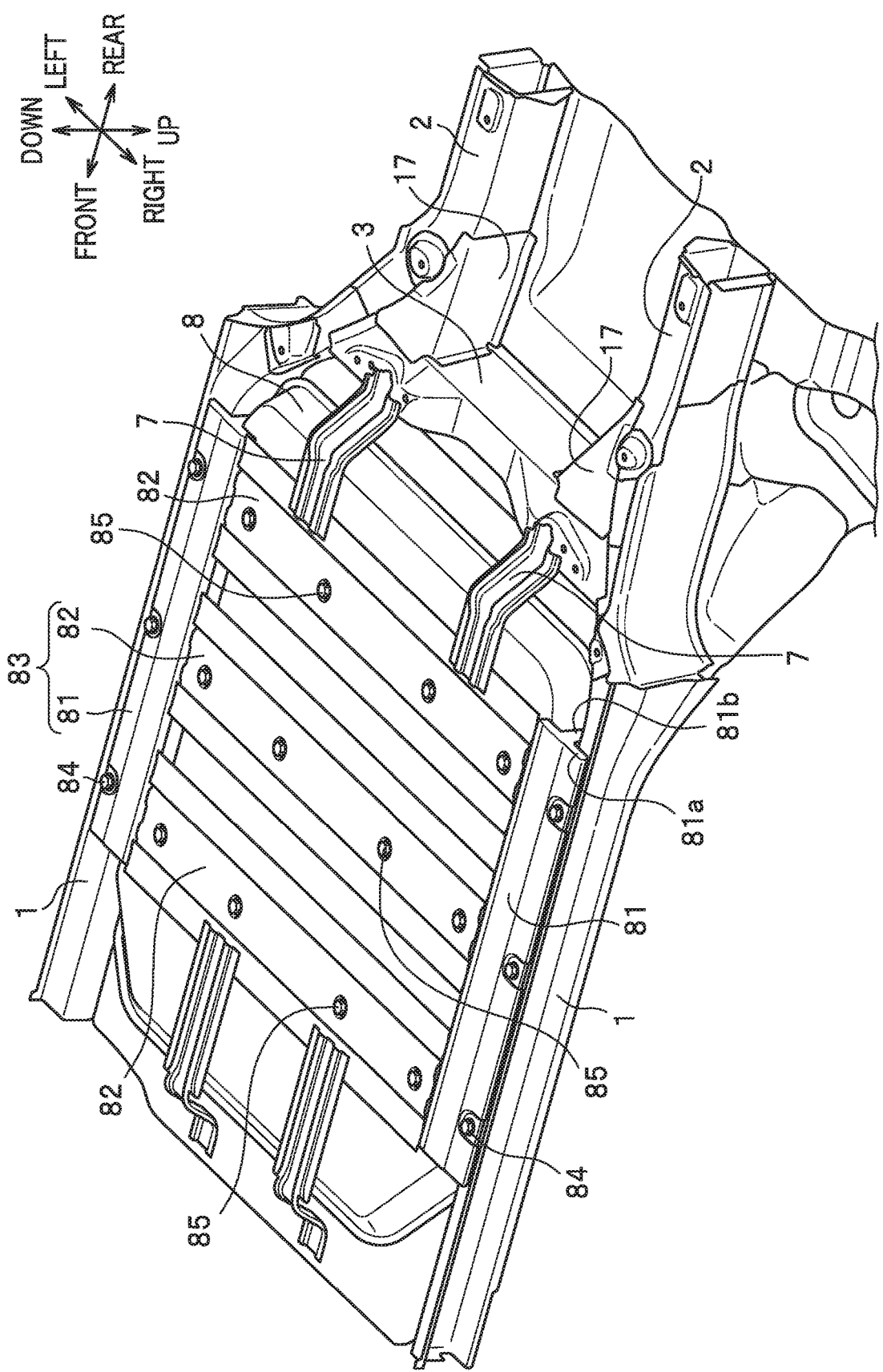
FIG. 5 is an overall perspective view of a battery-case mounting frame.

FIG. 5 is an overall perspective view of the battery-case mounting frame 83 (frame member).

This battery-case mounting frame 83 (frame member) supports the battery case 8 below a front floor panel 16a (see FIG. 4) and couples the side sills 1 (see FIG. 1) to each other.

As shown in FIG. 5, the battery-case mounting frame 83 (frame member) includes longitudinal members 81 and lateral members 82.

The longitudinal members 81 are disposed at both sides in the vehicle width direction. Specifically, the longitudinal members 81 are located below and inward of the side sills 1 and extend substantially in parallel with the side sills 1.

Each of the longitudinal members 81 is formed in a T-shape in cross-sectional view with a base plate 81a and a partition wall 81b.

The partition wall 81b is disposed between the side sill 1 and the battery case 8. The outer side of the base plate 81a in the vehicle width direction is disposed below the side sills 1 and the inner side of the base plate 81a in the vehicle width direction is disposed below the battery case 8.

The outer side of the base plate 81a in the vehicle width direction is fastened to the side sill 1 with bolts 84.

The lateral members 82 are attached to the pair of longitudinal members 81 so as to bridge the longitudinal members 81. The multiple lateral members 82 are disposed at certain intervals; in this embodiment, three lateral members 82 are disposed in the front-rear direction.

Both ends of the lateral members 82 in the vehicle width direction are joined to the inner edges of the longitudinal members 81 in the vehicle width direction by welding or other methods. Note that the bolts 84 described above fasten the longitudinal members 81 and the side sills 1 at positions where the lateral members 82 are disposed.

The battery case 8 is disposed on these lateral members 82 below the front floor panel 16a (see FIG. 3). Meanwhile, the front floor panel 16a is stretched between the side sills 1.

The battery case 8 is fastened to the lateral members 82 with bolts 85 disposed at appropriate positions on the lateral members 82.

Note that in FIG. 5, reference sign 2s indicate the rear side frames (rear load transfer member); reference sign 3, the rear crossmember (rear load transfer member); and reference sign 17s, the gussets (rear load transfer member).

<Bracket>

As shown in FIG. 2, the brackets 7 couple the battery case 8 and the rear crossmember 3 (rear load transfer member) via the lateral member 82. The brackets 7 are disposed in a pair in the vehicle width direction. Each bracket 7 is disposed to extend in the front-rear direction.

The brackets 7 are disposed frontward of the gussets 17 (rear load transfer member) shown in FIG. 3.

Figure 6:
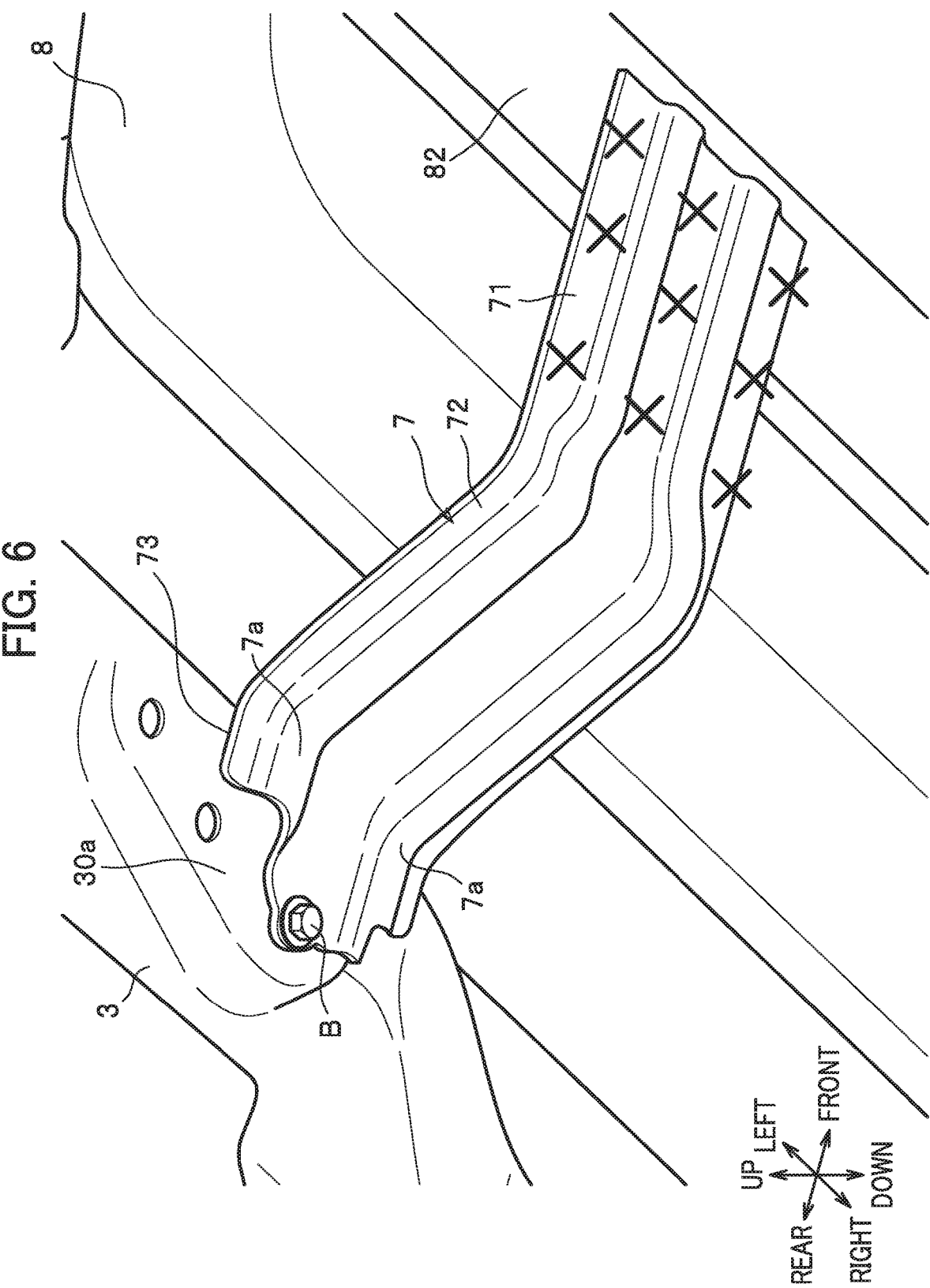
FIG. 6 is an overall perspective view of the bracket showing the bracket disposed at the left side of the rear portion in FIG. 1 as looked up at from a point outside in the vehicle width direction and on the obliquely lower side.

FIG. 6 is an overall perspective view of the bracket 7 showing the bracket 7 disposed at the left side of the rear portion in FIG. 1 as looked up at from a point outside in the vehicle width direction and on the obliquely lower side.

As shown in FIG. 6, the bracket 7 includes a front extension portion 71 extending in the front-rear direction on the bottom surface side of the battery case 8 and joined to the bottom surface of the battery case, an upward extension portion 72 extending upward from this front extension portion 71, and a rear extension portion 73 extending rearward from the upward extension portion 72.

In other words, the bracket 7 in this embodiment is a plate bent in a step shape so as to be adapted to the step between the bottom surface of the battery case 8 and the lower surface of the rear crossmember 3. This bracket 7 has multiple beads 7a formed to extend in the front-rear direction.

The rear extension portion 73 is disposed below the rear crossmember 3 (rear load transfer member) and fastened to this rear crossmember 3 in the up-down direction. Specifically, the rear extension portion 73 is fasten to the bracket mounting portion 30a of the rear crossmember 3 with a bolt B.

The front extension portion 71 of the bracket 7 extends to the lower surface of the lateral member 82 and is joined to the lower surface by welding or other methods. The front extension portion 71 is also joined to the lower surface of the battery case 8 by welding or other methods at a position where the front extension portion 71 is in contact with the lower surface of the battery case 8.

Figure 7:
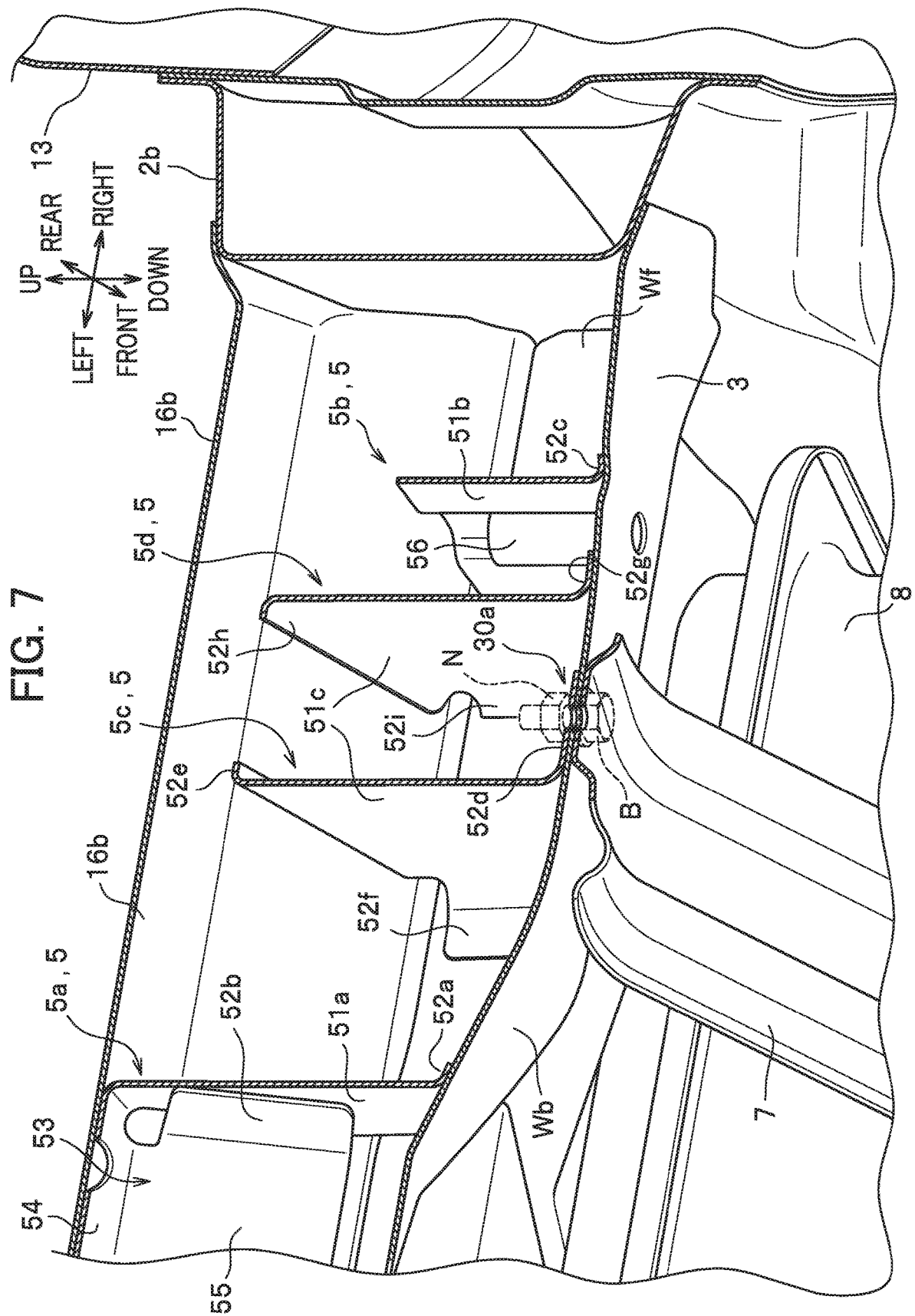
FIG. 7 is a partially enlarged perspective view of a rear crossmember including a cross-section taken along the line VII-VII in FIG. 2.

FIG. 7 is a partially enlarged perspective view of the rear crossmember 3 including a cross-section taken along the line VII-VII in FIG. 2. FIG. 7 shows the inside of the rear crossmember 3.

As shown in FIG. 7, inside the rear crossmember 3, to which the rear portion of the bracket 7 is fastened, is disposed a bulkhead 5. The bulkhead 5 is constituted of multiple plates (partition walls) partitioning the inside of the rear crossmember 3 in the direction intersecting the vehicle width direction.

The bulkhead 5 in this embodiment includes a first bulkhead 5a disposed at the center of the rear crossmember 3, a second bulkhead 5b disposed at a position corresponding to the second mounting portion 20b (see FIG. 2), and a pair of a third bulkhead 5c and a fourth bulkhead 5d disposed between the first bulkhead 5a and the second bulkhead 5b.

Note that the bracket 7 is attached to the rear crossmember 3 at a position corresponding to between the third bulkhead 5c and the fourth bulkhead 5d.

The first bulkhead 5a includes a partition plate 51a, a flange 52a formed along the lower edge of the partition plate 51a, and a stiffener 53 integrally formed with the partition plate 51a.

The flange 52a is connected to a bottom wall Wb of the rear crossmember 3.

The stiffener 53 has a connecting portion 54 connecting the partition plate 51a to the lower surface of the rear floor panel 16b, a reinforcement plate 55 integrally formed with this connecting portion 54 and descending from this connecting portion 54, and a flange 52b connecting this reinforcement plate 55 to the plate surface of the partition plate 51a. Although not shown, the partition plate 51a of the first bulkhead 5a has a flange connected to the rear wall of the rear crossmember 3.

The second bulkhead 5b includes a partition plate 51b, a flange 52c formed along the lower edge of the partition plate 51b, and a collar 56 connected to the partition plate 51b. Inside the collar 56 is disposed a nut (not shown) into which the bolt B (see FIG. 4) at a second connecting portion 40b (see FIG. 4) is fastened. Although not shown, the partition plate 51b of the second bulkhead 5b has flanges each connected to a front wall Wf and the rear wall (not shown) of the rear crossmember 3.

The third bulkhead 5c includes a partition plate 51c, a flange 52d formed along the lower edge of the partition plate 51c, a flange 52e formed along the upper edge of the partition plate 51c, and a flange 52f formed along the front edge of partition plate 51c.

The flange 52d is connected to the bottom wall Wb of the rear crossmember 3.

The flange 52d is penetrated by the bolt B, together with the front edge of the bracket 7 and the bottom wall Wb of the rear crossmember 3. This bolt B is engaged with a plate nut N by the thread.

In other words, the front edge of the flange 52d in this embodiment is also fastened to the third bulkhead 5c disposed inside the rear crossmember 3.

The flange 52e is connected to the lower surface of the rear floor panel 16b, and the flange 52f is connected to a front wall Wf of the rear crossmember 3.

The fourth bulkhead 5d includes a partition plate 51d, a flange 52g formed along the lower edge of the partition plate 51d, a flange 52h formed along the upper edge of the partition plate 51d, and a flange 52i formed along the front edge of the partition plate 51d.

The flange 52h is connected to the lower surface of the rear floor panel 16b, the flange 52i is connected to the front wall Wf of the rear crossmember 3, and the flange 52g is connected to the bottom wall Wb of the rear crossmember 3.

Note that in FIG. 7, reference sign 30a indicates the bracket mounting portion of the rear crossmember 3, reference sign 2b indicates the oblique portion of the rear side frame 2, and reference sign 13 indicates the wheel arch.

<Reinforcement Member>

Next, the reinforcement member 9 (see FIG. 4) will be described.

As shown in FIG. 4, the reinforcement member 9 is disposed on the upper surface of the front floor panel 16a (floor panel) so as to extend in the front-rear direction. In other words, the reinforcement member 9 extends in the front-rear direction above the battery case 8.

Although not shown, the reinforcement member 9 in this embodiment has a hat shape that opens downward in cross-sectional view. The opening of the hat shape is closed with the upper surface of the front floor panel 16a, and thus the reinforcement member 9 forms a closed cross section. Flanges 19a of the reinforcement member 9, corresponding to the brim of the hat shape, are connected to the upper surface of the front floor panel 16a by welding or other methods.

The reinforcement member 9 is connected at the front edge thereof to a floor crossmember 15 extending in the vehicle width direction on the upper surface of the front floor panel 16a and extends rearward.

The reinforcement member 9 in this embodiment extends at a position overlapping the bracket 7 in the up-down direction. In other words, a pair of reinforcement members 9 are aligned with the pair of brackets 7 in the up-down direction.

The rear portion of the reinforcement member 9 is bent stepwise to be adapted to a height difference in a step shape, formed around the border of the front floor panel 16a and the rear floor panel 16b.

The rear edge of the reinforcement member 9 is connected to a vertical wall 16b1 of the rear floor panel 16b rising upward from the front floor panel 16a, via a flange 19b by welding or other methods.

<Rear Subframe>

Next, the rear subframe 4 (see FIG. 2) will be described.

As shown in FIG. 4, the rear subframe 4 is disposed below the rear side frames 2. On the rear subframe 4 are mounted the driving unit (not shown) and the rear suspension unit (not shown).

The rear subframe 4 includes front-rear portions 4a disposed below the front-rear portions 2a of the rear side frames 2 and extending in the front-rear direction, and oblique portions 4b disposed below the oblique portions 2b of the rear side frames 2 and extending in the front-rear direction. The front-rear portions 4a are connected to the rear ends of the oblique portions 4b.

Returning to FIG. 2, in bottom view, the front-rear portions 4a are located inward of the rear side frames 2 and extends in the front-rear direction so as to be substantially in parallel with the front-rear portions 2a. The rear portions of the front-rear portions 4a are coupled to each other with a cross beam 41.

The oblique portions 4b are located inward of the rear side frames 2 and extend substantially in parallel with the oblique portions 2b in bottom view. In other words, each oblique portion 4b extends obliquely so as to be displaced gradually outward in the vehicle width direction as extending forward from the front end of the front-rear portion 4a. The oblique portion 4b extends from the front-rear portion 4a side to the front edge of the rear crossmember 3. The rear portions of the oblique portions 4b are coupled to each other with a cross beam 42.

The rear subframe 4 further includes extended portions 4c. Each extended portion 4c extends outward in the vehicle width direction from the front edge of the oblique portion 4b along the front edge of the rear crossmember 3. The distal end portion of the extended portion 4c is located at the narrow portion 14 (see FIG. 3) of the rear side frame 2.

In the distal end portion of the extended portion 4c is formed a first connecting portion 40a at a position corresponding to the first mounting portion 20a (see FIG. 3) formed in the narrow portion 14.

In the front portion of the oblique portion 4b is formed the second connecting portion 40b at a position corresponding to the second mounting portion 20b (see FIG. 3) of the rear crossmember 3.

In the rear portion of the oblique portion 4b is formed a third connecting portion 40c at a position corresponding to the third mounting portion 20c (see FIG. 3) of the rear side frame 2. The third connecting portion 40c is formed at a position corresponding to the coupling portion between the rear portion of the oblique portion 4b and the cross beam 42.

As shown in FIG. 2, in the rear portion of the front-rear portion 4a is formed a fourth connecting portion 40d at a position corresponding to the fourth mounting portion 20d (see FIG. 3) of the rear side frame 2. The fourth connecting portion 40d is formed at a position corresponding to the coupling portion between the rear portion of the front-rear portion 4a and the cross beam 41.

As shown in FIG. 4, the second connecting portion 40b, third connecting portion 40c, and fourth connecting portion 40d of the rear subframe 4 are attached with the bolts B to the second mounting portion 20b of the rear crossmember 3 and the third mounting portion 20c and fourth mounting portion 20d of the rear side frame 2, respectively. Although not shown, the first connecting portions 40a (see FIG. 1) are attached to the first mounting portions 20a (see FIG. 2) via bolts.

<Operational Effects>

Next, description will be provided for the operational effects achieved by the vehicle rear structure S in this embodiment.

In the vehicle rear structure S in this embodiment, the brackets 7 extend from the rear crossmember 3, which is included in the rear load transfer member, to below the battery case 8 and are joined to the bottom surface of the battery case 8 in the up-down direction, as shown in FIG. 6.

In the vehicle rear structure S in this embodiment, when a load at a rear-end collision of the vehicle (collision load) is inputted to the rear side frames 2 via the bumper beam 6 and the bumper beam extensions 6a shown in FIG. 2, the collision load is transferred from the rear side frames 2 to the side sills 1. In the vehicle rear structure S, the collision load is also inputted to the battery case 8 via the gussets 17 and rear crossmember 3 shown in FIG. 3 as well as the brackets 7 shown in FIG. 6.

Unlike a conventional vehicle rear structure (for example, the one in Patent Literature 1) in which an inputted collision load generates forces in peeling directions at the joined portions of the brackets, the collision load is inputted to the joined portions of the brackets 7 in shearing directions in this vehicle rear structure S. Thus, in this vehicle rear structure S, the collision load inputted to the rear side frames 2 can be transferred forward of the vehicle body more efficiently than the conventional vehicle rear structure, and the joint strength of the brackets 7 is superior to the conventional vehicle rear structure.

In addition, in the vehicle rear structure S in this embodiment, the collision load is inputted in a direction in which the bottom surface of the battery case 8 extends, so that it possible to avoid the collision load being inputted to the rear surface of the battery case 8 and also possible to prevent the rear surface of the battery case 8 from being deformed.

In the vehicle rear structure S in this embodiment, the brackets 7 are also joined to the lateral member 82 as shown in FIG. 6.

In this vehicle rear structure S, the collision load inputted via the brackets 7 can be dispersed via the lateral members 82 over a wide area in the vehicle width direction. Thus, the vehicle rear structure S is excellent in performance of absorbing collision energy.

In the vehicle rear structure S in this embodiment, the battery case 8 is disposed between the side sills 1, and the battery-case mounting frame 83 (frame member) couples the side sills 1 to each other as shown in FIG. 1.

In this vehicle rear structure S, the collision load inputted via the brackets 7 can be transferred to the side sills 1 via the battery-case mounting frame 83 (frame member). In this vehicle rear structure S, the collision load inputted to the rear side frames 2 can be transferred forward of the vehicle body more positively.

In the vehicle rear structure S in this embodiment, the front extension portions 71 of the brackets 7 are joined to the bottom surface of the battery case 8 by welding or other methods as shown in FIG. 6. The rear extension portions 73 are disposed below the rear crossmember 3 (rear load transfer member) and fastened to the rear crossmember 3 in the up-down direction.

With this vehicle rear structure S, in an assembly process, the brackets 7 are joined to the battery case 8 in advance. Then, when the battery case 8 is assembled to the vehicle body, the brackets 7 are fastened to the rear crossmember 3 (rear load transfer member).

This vehicle rear structure S makes the assembly process easier.

The reinforcement members 9 of the vehicle rear structure S in this embodiment are aligned with the brackets 7 in the up-down direction as shown in FIG. 4.

In this vehicle rear structure S, the brackets 7 and the reinforcement members 9 complement each other and reduce deformation mutually more positively.

These reinforcement members 9 of the vehicle rear structure S extend rearward from the floor crossmember 15 as shown in FIG. 4.

In this vehicle rear structure S, the collision load transferred to the rear crossmember 3, which is included in the rear load transfer member, is transferred to the floor crossmember 15 via the vertical wall 16b1 of the rear floor panel 16b and the reinforcement members 9 (see FIG. 4).

In this vehicle rear structure S, the collision load from the rear crossmember 3 (rear load transfer member) can be transferred to the floor crossmember 15, so that the collision load inputted to the rear side frames 2 (rear load transfer member) can be transferred to the front portion of the vehicle body 10 more positively.

In this vehicle rear structure S, the brackets 7 are attached to the third bulkheads 5c via the flanges 52d with the bolts B and the plate nuts N as shown in FIG. 7.

In this vehicle rear structure S, the collision load inputted to the rear crossmember 3 (rear load transfer member) can be transferred to the brackets 7 more positively by the third bulkheads 5c.

In the vehicle rear structure S in this embodiment, the second mounting portions 20b for the rear subframe 4 (see FIG. 2) and the bracket mounting portions 30a for the brackets 7 (see FIG. 1) are disposed on the rear crossmember 3 (rear load transfer member) to be adjacent to each other as shown in FIG. 3.

In this vehicle rear structure S, the mounting rigidity of the brackets 7 is high. Thus, this vehicle rear structure S is capable of transferring the collision load more positively to the battery case 8 via the brackets 7.

The embodiment of the present invention has been described above; however, the present information is not limited to the above embodiment and can be implemented in various forms.

Although in this embodiment, the reinforcement members 9 are disposed on the upper surface of the front floor panel 16*a* as shown in FIG. 4, the present invention is not limited to this configuration.

Figure 8:
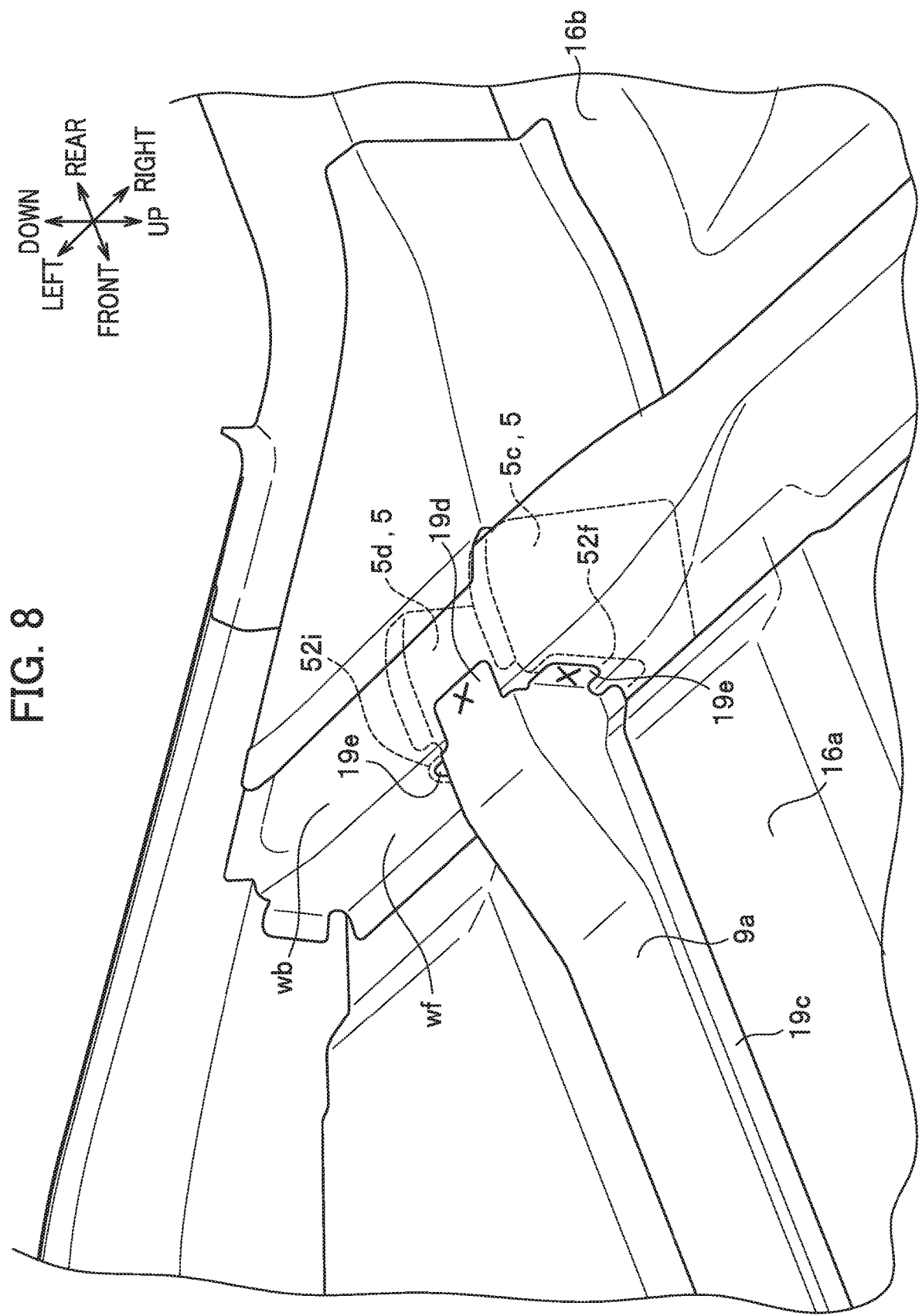
FIG. 8 is a partial perspective view of a reinforcement member included in a vehicle rear structure according to a second embodiment of the present invention.

FIG. 8 is a partial perspective view of a reinforcement member 9*a* included in a vehicle rear structure S according to a second embodiment of the present invention.

As shown in FIG. 8, the reinforcement member 9*a* in the vehicle rear structure S according to the second embodiment is disposed on the lower surface of the front floor panel 16*a*.

The reinforcement member 9*a* extends in the front-rear direction on the lower surface of the front floor panel 16*a* (floor panel).

Although not shown, the reinforcement member 9*a* has a hat shape that opens upward in cross-sectional view. The opening of the hat shape is closed with the lower surface of the front floor panel 16*a*, and thus the reinforcement member 9*a* forms a closed cross section. Meanwhile, the reinforcement member 9*a* is connected to the lower surface of the front floor panel 16*a* via flanges 19*c*, corresponding to the brim of the hat shape, by welding or other methods.

Although not shown, the reinforcement members 9*a* extend at positions overlapping the brackets 7 in the up-down direction. In other words, a pair of reinforcement members 9*a* are aligned with the pair of brackets 7 such that the reinforcement members 9*a* and the brackets 7 sandwich the battery case 8 in the up-down direction.

The rear portion of the reinforcement member 9*a* has a lower surface inclined such that the lower surface changes in height to be adapted to the height of the rear crossmember 3 (rear load transfer member) as getting closer to the rear crossmember 3, and the rear portion of the reinforcement member 9*a* is connected to the bottom wall Wb of the rear crossmember 3 via a flange 19*d* by welding or other methods.

In addition, flanges 19*e* on both sides of the rear portion of the reinforcement member 9*a* in the vehicle width direction are connected to the front wall Wf of the rear crossmember 3 by welding or other methods.

The flanges 19*e* are welded to the flange 52*f* of the third bulkhead 5*c* and the flange 52*f* of the fourth bulkhead 5*d* in the rear crossmember 3, respectively, via and together with the front wall Wf.

In other words, the rear portion of the reinforcement member 9*a* is disposed at a position overlapping the bulkhead 5 in the vehicle width direction and in the up-down direction.

In the vehicle rear structure S described above, the reinforcement members 9*a* are coupled to the rear crossmember 3 (rear load transfer member) as shown in FIG. 8. In addition, as described earlier, the reinforcement members 9*a* are aligned with the brackets 7 in the up-down direction such that the reinforcement members 9*a* and the brackets 7 sandwich the battery case 8.

In this vehicle rear structure S, the collision load inputted to the rear crossmember 3 (rear load transfer member) can be transferred forward of the vehicle body 10 through the brackets 7 and the reinforcement members 9*a*. With this configuration, the brackets 7 and the reinforcement members 9*a* complement each other and reduce deformation mutually more positively.

In this vehicle rear structure S, the reinforcement members 9*a* are disposed at positions overlapping the bulkheads 5 in the vehicle width direction and in the up-down direction.

This vehicle rear structure S is capable of transferring the collision load inputted to the rear crossmember 3 (rear load transfer member) to the reinforcement members 9*a* more positively with the bulkheads 5.

Although the embodiment described earlier includes the gussets 17, which is included in the rear load transfer member, as shown in FIG. 3, the gussets 17 may be omitted in the present invention.

In addition, in the embodiment described earlier, the brackets 7 are attached to the rear crossmember 3, which is included in the rear load transfer member, as shown in FIG. 1. However, in the present invention, the brackets 7 may extend from the oblique portions 2*b* of the rear side frames 2, which are included in the rear load transfer member, to the lower surface of the battery case 8.

What is claimed is:

1. A vehicle rear structure comprising:
   a battery case housing a battery;
   a rear load transfer member which is disposed rearward of the battery case and transfers forward a collision load at the time of collision;
   a bracket to transfer the collision load from the rear load transfer member to the battery case; and
   a pair of side sills extending in a front-rear direction on both sides of a vehicle body, wherein
   the rear load transfer member comprises
      rear side frames extending rearward from rear ends of the side sills, and
      a rear crossmember coupling the rear side frames to each other, and
   the bracket extends from the rear crossmember to below the battery case and is joined to a bottom surface of the battery case in an up-down direction.

2. The vehicle rear structure according to claim 1, further comprising
   a frame member extending in a vehicle width direction and joined to the bottom surface of the battery case, wherein
   the bracket is also joined to the frame member.

3. The vehicle rear structure according to claim 2, wherein
   the battery case is disposed between the side sills, and
   the frame member couples the side sills to each other.

4. The vehicle rear structure according to claim 1, wherein
   the bracket includes
      a front extension portion extending in a front-rear direction and joined to the bottom surface of the battery case,
      an upward extension portion extending upward from the front extension portion, and
      a rear extension portion extending rearward from the upward extension portion, and
   the rear extension portion is disposed below the rear load transfer member and fastened to the rear load transfer member in the up-down direction.

5. The vehicle rear structure according to claim 1, wherein
   a rear subframe is disposed below the rear load transfer member, and
   an attachment point between the bracket and the rear load transfer member and an attachment point between the rear subframe and the rear load transfer member are adjacent to each other.

6. A vehicle rear structure comprising:
   a battery case housing a battery;

a rear load transfer member which is disposed rearward of the battery case and transfers forward a collision load at the time of collision;

a bracket to transfer the collision load from the rear load transfer member to the battery case; and a reinforcement member extending in a front-rear direction above the battery case and coupled to the rear load transfer member, wherein the bracket extends from the rear load transfer member to below the battery case and is joined to a bottom surface of the battery case in an up-down direction.

7. The vehicle rear structure according to claim 6, wherein the reinforcement member is aligned with the bracket in the up-down direction.

8. The vehicle rear structure according to claim 6, further comprising:

a pair of side sills extending in a front-rear direction on both sides of a vehicle body;

a floor panel disposed between the side sills; and a floor crossmember extending in a vehicle width direction above the floor panel, wherein the reinforcement member extends rearward from the floor crossmember.

9. The vehicle rear structure according to claim 6, wherein the rear load transfer member includes a pair of rear side frames extending in the front-rear direction on both sides of a rear portion of a vehicle body, and a rear crossmember having a closed cross section and coupling the rear side frames to each other, wherein a bulkhead is disposed inside the closed cross section of the rear crossmember, and the reinforcement member is disposed in a position overlapping the bulkhead in a vehicle width direction and in the up-down direction.

10. The vehicle rear structure according to claim 9, wherein the bracket is attached to the bulkhead.

* * * * *